(12) United States Patent
Aoyama (10) Patent No.: US 6,515,621 B2
(45) Date of Patent: Feb. 4, 2003

(54) NAVIGATION APPARATUS

(75) Inventor: Akihiro Aoyama, Shizuoka-ken (JP)

(73) Assignee: JATCO TransTechnology Ltd., Fuji (JP)

( * ) Notice: Subject to any disclaimer, the term of this patent is extended or adjusted under 35 U.S.C. 154(b) by 0 days.

(21) Appl. No.: 09/989,196

(22) Filed: Nov. 21, 2001

(65) Prior Publication Data

US 2002/0063654 A1 May 30, 2002

(30) Foreign Application Priority Data

Nov. 27, 2000 (JP) ........................................ 2000-359168

(51) Int. Cl.⁷ .............................. G01S 5/14; G01C 21/30
(52) U.S. Cl. .................................. 342/357.13; 701/208
(58) Field of Search ..................... 342/357.06, 357.12, 342/357.13; 701/207, 208, 213, 215

(56) References Cited

U.S. PATENT DOCUMENTS

| 5,646,629 | A | * | 7/1997 | Loomis et al. | ............... | 342/357 |
| 6,024,655 | A | * | 2/2000 | Coffee | ........................ | 473/407 |
| 6,381,537 | B1 | * | 4/2002 | Chenault et al. | ............ | 701/209 |
| 6,385,536 | B2 | * | 5/2002 | Kimura | ....................... | 701/209 |
| 6,415,224 | B1 | * | 7/2002 | Wako et al. | ................. | 701/208 |
| 6,434,481 | B2 | * | 8/2002 | Winter et al. | ............... | 701/208 |

* cited by examiner

*Primary Examiner*—Dao Phan
(74) *Attorney, Agent, or Firm*—Blank Rome Comisky & McCauley, LLP

(57) ABSTRACT

A navigation apparatus is equipped with a position acquisition section for acquiring positional information on a self-position, a map hold section for holding a map, and a central control section. The central control section functions as a first display control section for reading out the map containing the self-position from the map hold section and then causing display section to display the map containing the self-position, and also functions as a second display control section for setting a target spot at an arbitrary natural feature on the earth or arbitrary position within the map displayed on the display section and then causing the display section to display the target object. Furthermore, the central control section functions as an event generation section for generating a predetermined game event when the self position arrives at the target spot, or is within a predetermined allowable range, or moves around a predetermined range, and functions as a game process section for performing a game process in response to the generated game event.

6 Claims, 10 Drawing Sheets

NAVIGATION APPARATUS

BACKGROUND OF THE INVENTION

1. Field of the Invention

The present invention relates to a navigation apparatus, and more particularly to a portable navigation apparatus that displays a map and a self-position mark on a display and provides a navigation function, such as ascertainment of a self-position, route guidance, etc., during travelling, tracking, etc.

2. Description of the Related Art

Navigation apparatuses take advantage of a global positioning system (GPS) to obtain positional information. The positional information is displayed as it is, or is displayed on a map. Among navigation apparatuses, the navigation apparatus utilizing the GPS has high measurement accuracy (about a few ten meters), and portable navigation apparatuses with a map display function have recently been put to practical use. Such a portable navigation apparatus is one of the items convenient to carry out when traveling through a strange place. However, the conventional navigation apparatuses are limited to a navigation function such as route guidance, etc. In the situation in which the navigation function is not needed, the conventional navigation apparatuses are seldom utilized and are likely to become loads.

SUMMARY OF THE INVENTION

The present invention has been made in view of the circumstances mentioned above. Accordingly, it is the primary object of the present invention to provide a navigation apparatus that is capable of enhancing its utilization value by having a useful function other than the navigation function.

To achieve this end, there is provided a navigation apparatus comprising: position acquisition means for acquiring positional information on a self-position; map hold means for holding a map; first display control means for reading out the map containing the self-position from the map hold means and then causing display means to display the map containing the self-position; second display control means for setting a target spot at an arbitrary natural feature on the earth or arbitrary position within the map displayed on the display means and then causing the display means to display the target object; event generation means for generating a predetermined game event when the self position arrives at the target spot, or is within a predetermined allowable range, or moves around a predetermined range; and game process means for performing a game process in response to the generated game event.

According to the present invention, a target spot is displayed on a map. If a self-position arrives at the target spot or is within a predetermined allowable range, a game process is performed. Therefore, the navigation apparatus of the present invention has a useful function (game function) other than the navigation function. Thus, the present invention is capable of providing a navigation apparatus enhancing its utilization value by realizing a plurality of functions.

In a preferred form of the present invention, the position acquisition means acquires the positional information by utilizing a global positioning system (GPS). Since the GPS is employed, the position of the navigation apparatus can be accurately measured and therefore games can be accurately performed.

In another preferred form of the present invention, the game process means sets a quiz in response to the generated game event, and performs a game-points process, based on an answer to the quiz. Since a quiz is set for each target spot, games can be made more interesting.

Instill another preferred form of the present invention, the quiz has contents related to the target spot. In this case, the present invention is capable of providing a navigation apparatus useful for sight-seeing guidance and social study.

In a further preferred form of the present invention, the map hold means holds a virtual map including virtual geographical features and natural features on the earth. Since games can be performed based on virtual map information, the games can be made more interesting.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENTS

Figure 1:
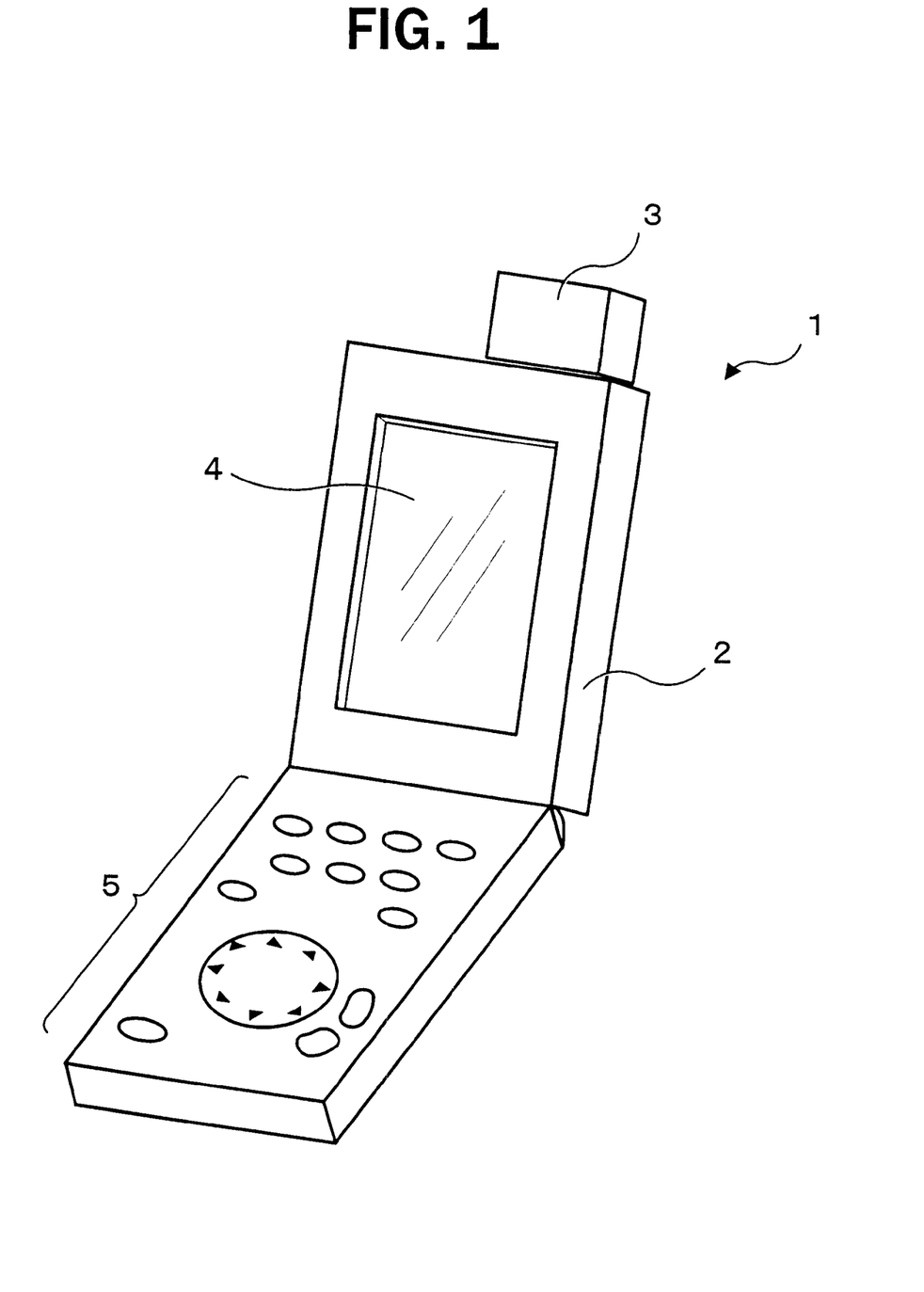
FIG. 1 is a schematic diagram showing a navigation apparatus constructed according to a preferred embodiment of the present invention.

Referring now in greater detail to the drawings and initially to FIG. 1, there is shown a navigation apparatus 1 in accordance with a preferred embodiment of the present invention. The navigation apparatus 1 is equipped with a portable case 2 (although the illustrated example is of a folding type, the present invention is not limited to this), a GPS antenna 3, a liquid crystal display (display means) 4, and a key control section 5.

The GPS antenna 3 is an antenna element for receiving electronic radio waves for a global positioning system (GPS). The electronic radio waves are position measuring radio waves (among which, a commercial radio wave is a radio wave L1 of wavelength 19 cm) that are emitted from a plurality of satellites circling along 6 orbits of altitude about 20200 km above the earth and inclination angle 55° in about 12 hours. In the GPS, electronic radio waves from 3 or more satellites are received at all regions on the earth, and the coordinates (latitude and longitude) of a position on the earth are specified based on the received information.

The liquid crystal display 4 has resolution to the degree that an image and information (a character, etc.) can be displayed. It is preferable that the liquid crystal display 4 be a color liquid crystal display panel. The key control section 5 is equipped with a power switch for the navigation apparatus 1, and various function keys, a menu key, a scroll key, and a zoom key which are employed for navigation and other functions.

Figure 2:
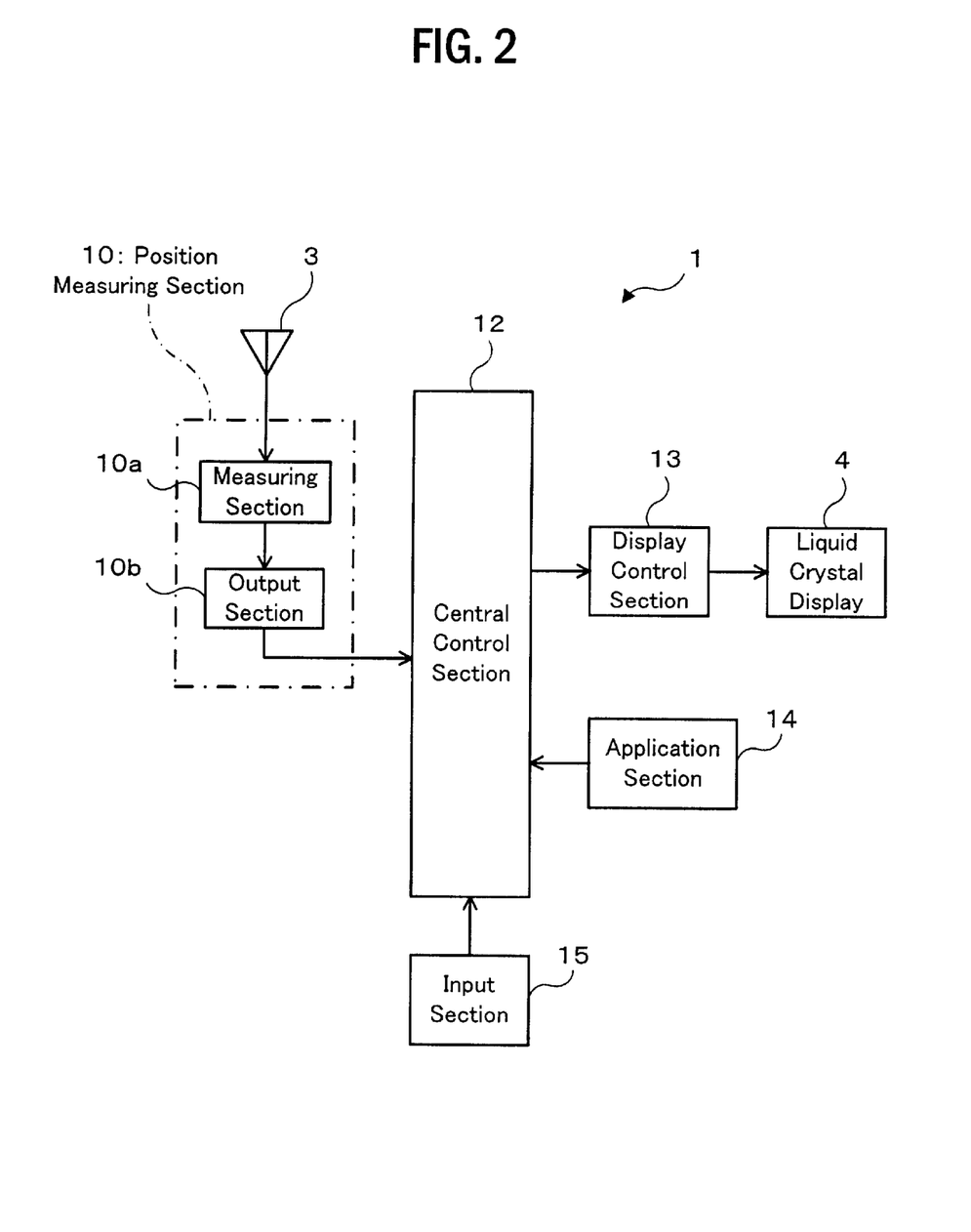
FIG. 2 is a conceptual block diagram showing the electrical construction of the navigation apparatus of the preferred embodiment.

FIG. 2 shows the electrical construction of the navigation apparatus 1. As shown in the figure, the navigation apparatus 1 is constructed of a position measuring section 10 (position acquisition means), a central control section 12 (first display control means, second display control means, event generation means, and game process means), an application section 14 (map hold means), and an input section 15. The functions of the sections are as follows.

The position measuring section 10 consists of a measuring section 10a and an output section 10b. The measuring section 10a specifies the position (latitude and longitude) of the navigation apparatus 1 on the earth by analyzing the electronic radio waves from the GPS satellites, received with the GPS antenna 3. The output section 10b converts the specified positional information to a predetermined format and outputs it to the central control section 12.

The position measuring accuracy of the GPS is about 100 to 300 m with the selective availability (SA) (which is the function of intentionally decreasing accuracy at the request of the Department of Defense) on and is about a few meters to a few ten meters with the SA off. Furthermore, even when a differential GPS (which is a method of correcting for an error by employing data received from a base station) is employed, the same accuracy is obtained.

The position measuring principle of the GPS is as follows: For example, assume that the positions of 3 satellites A, B, and C are known. If a distance from the satellite A to the position of the navigation apparatus 1 is assumed to be a, the navigation apparatus 1 is situated at a certain point on the surface of the sphere A' of radius a with the satellite A as the center. At the same time, if a distance from the satellite B to the position of the navigation apparatus 1 is assumed to be b, the navigation apparatus 1 is situated at a certain point on the circumference where the sphere A' with a radius of a and the sphere B' with a radius of b overlap each other. Furthermore, if a distance from the satellite C to the position of the navigation apparatus 1 is assumed to be c, the position of the navigation apparatus 1 is situated at the intersection between the spheres A', B', and C'. In an actual measurement, a signal is received from the fourth satellite and used for a correction of time shift. Note that although the position of a satellite is expressed by an orthogonal coordinate system fixed to the earth, it can be calculated by employing the 6 calculation parameters of orbital information transmitted from satellites (6 orbital elements: long radius, eccentricity, mean anomaly, orbital inclination, north-bound node longitude, and perigee argument).

The display control section 13 drives the liquid crystal display 4 according to a display signal output from the central control section 12 so that a map, self-position information, and route information for navigation are displayed on the screen. In addition, during execution of a game function to be described later, various information related to the game function are displayed.

Figure 3:
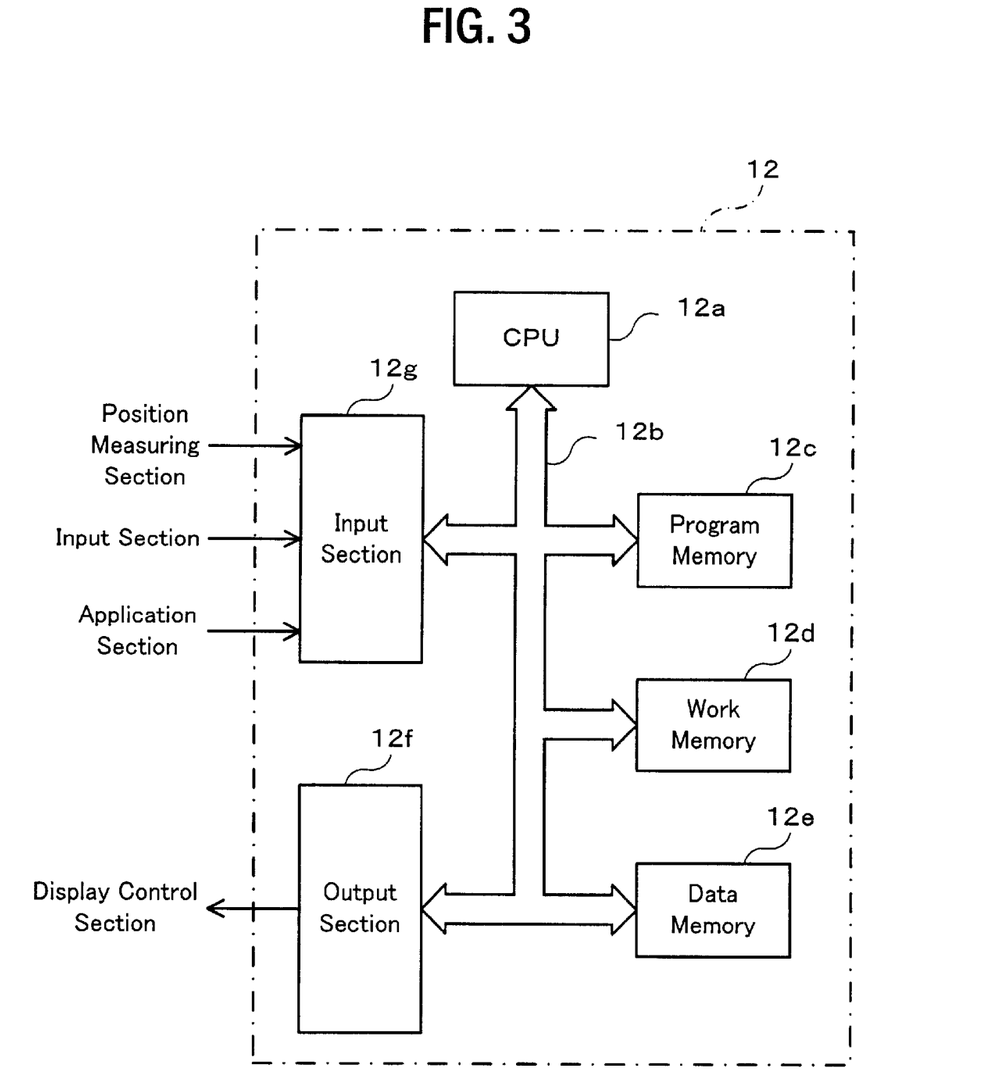
FIG. 3 is a conceptual block diagram of the central control section of the navigation apparatus of the preferred embodiment.

The central control section 12 controls the entire operation of the navigation apparatus 1. As shown in FIG. 3, the central control section 12 is equipped with a central processing unit (CPU) 12a. The CPU 12a is connected with a program memory 12c, a work memory 12d, a data memory 12e, an output section 12f, and an input section 12g through a bus 12b. The CPU 12a realizes the navigation function, the game function, etc., by reading out the operating system stored in the program memory 12b, a user application program to be described later, and the data, then executing them on the work memory 12d, and then organically coupling these software resources with hardware resources such as the CPU 12a, etc.

Figure 4:
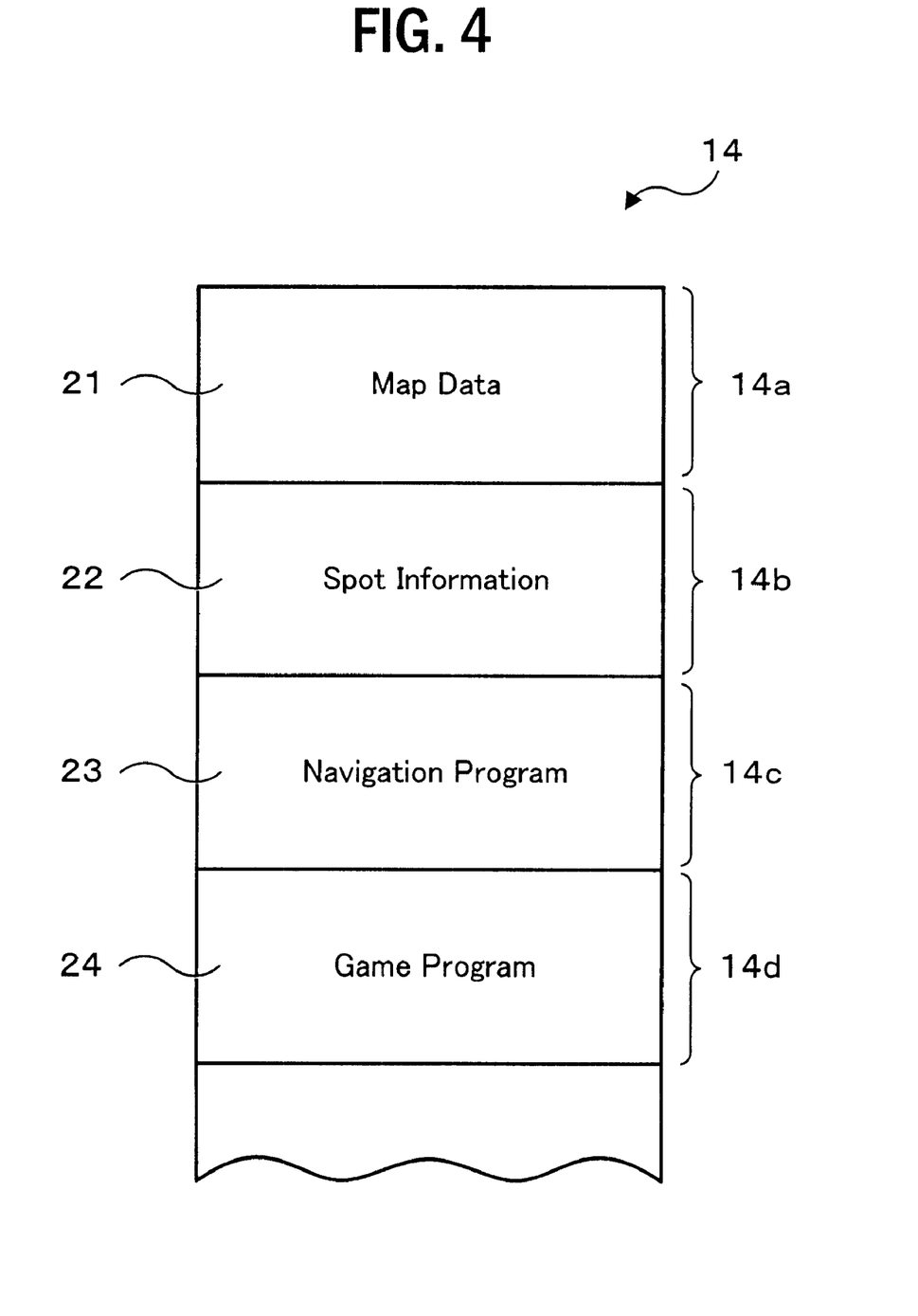
FIG. 4 is a diagram showing the conceptual structure of the application section of the navigation apparatus of the preferred embodiment.

The application section 14 is a fixed or detachable storage device. As shown in FIG. 4, the storage device is provided with a map data storage section 14a, a spot information storage section 14b, a navigation program storage section 14c, and a game program storage section 14d. Map data 21, spot information 22, a navigation program 23, and a game program 24 have previously been stored in the above-mentioned storage sections.

The map data 22 is an electron density map or numerical map (collection of data) showing map information such as rivers, geographical features, natural features on the earth, etc. The spot information 22 is detailed information on geographical features and natural features on the earth, stored in the map data 21. The navigation program 23 and the game program 24 are user application programs designed to realize the navigation function and the game function by utilizing the map data 21 and the spot information 23.

The CPU 12a acquires the present positional information from the position measuring section 10. Then, the CPU 12a reads out a wide area map or detailed map containing the acquired position from the map data storage section 14a, and sends it to the display control section 13. The map is displayed on the liquid crystal display 4. Furthermore, the CPU 12a performs a present-position display process to display a predetermined present position mark at the present position obtained from the above-mentioned positional information, and also performs auxiliary processes (route prediction, altitude display, heading display, moving-speed display, etc.,) required for route guidance.

If a user selects execution of a predetermined game function through the input section 15, the CPU 12a reads out the game program 24 from the application section 14 and executes the game program 24. The selected game is performed by utilizing positional information. For example, it may be a position occupying game (or parcheesi) of occupying points specified on a map.

FIGS. 5A and 5B shows how the position occupying game is executed. For example, a detailed map 31 of the Tokyo Metropolitan Government and neighborhood is displayed on the liquid crystal display 4. The detailed map 31 is read out from the map data storage section 14a of the application section 14 according to the present position.

With the game program 24, spots 31b to 31e are specified on roads around the Metropolitan Government 31a in the detailed map 31. The user first goes to the spot 31b having a starting mark 31f. Then, the user starts from the spot 31b and goes around the Metropolitan Government 31a through the spots 31c to 31e. The selection of a map and the judgment of an arrival at a spot are made by utilizing the positional information obtained by the GPS. If the user arrives at each spot or is within a predetermined allowable range, the game program 24 generates a game event. Next, the game program 24 performs a game-points addition process according to the game-points condition defined at each spot. Finally, the points made are displayed on the liquid crystal display 4.

Thus, the navigation apparatus 1 has not only the navigation function but also the game function and is therefore capable of enhancing its utilization value.

Note that if the number of spots is increased and routes are made longer, the present invention is applicable not only to a simple position-occupying game but also to a game having sporting activities, such as orienteering, etc. In addition, when the user arrives at a specific spot, a stop mark 31*g* may be displayed. In this case, a suitable quiz 31*h* related to the specific spot may be set. The game may be constructed so that only when the user gives a right answer, the user can go to the next spot. Moreover, the game may be constructed so that if the user answers right, the user can make points. If the user answers right in a short time, points may be increased. Furthermore, various virtual tricks (which are displayed on the liquid crystal display 4) may be installed in routes.

Figure 6:
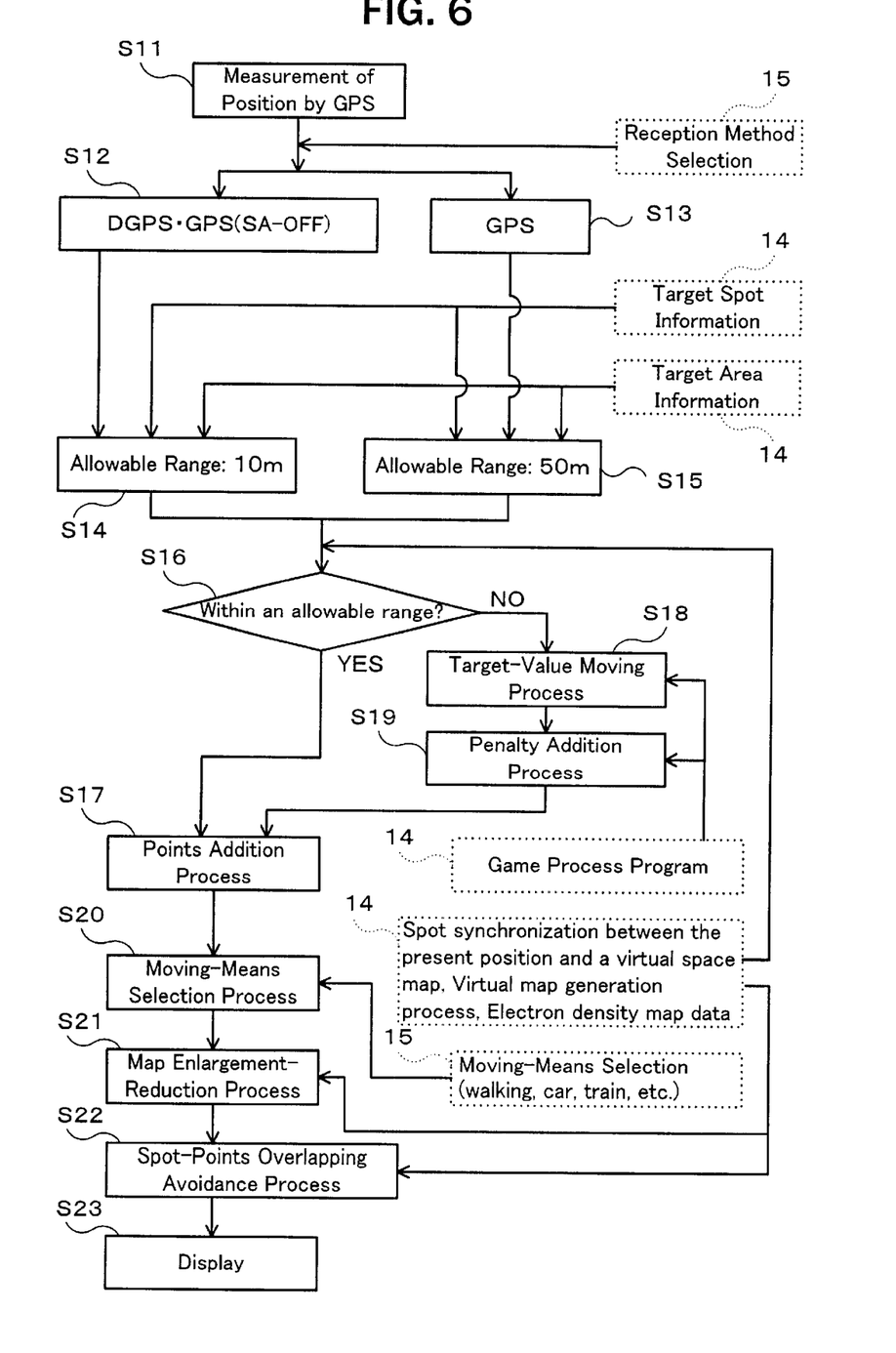
FIG. 6 is a flowchart showing how a game program for the position occupying game is executed by the navigation apparatus of the preferred embodiment.

FIG. 6 shows a game program for realizing the position occupying game. In step S1, the position of the user is measured based on the information obtained by the GPS. The result of the measurement is processed according to a method of reception (e.g., a differential GPS, a GPS with the SA off, a GPS with the SA on, etc.) selected by the user. For example, when the present position of the user is measured with a high-accuracy method (e.g., a differential GPS, a GPS with the SA off, etc.), the game program advances from step S12 to step S14. In step S14, accuracy of the measurement is set, for example, to 10 m. When the present position of the user is measured with an ordinary-accuracy method (e.g., a GPS with the SA on), the game program advances from step S13 to step S15, in which accuracy of the measurement is set, for example, to 50 m.

In step S16 it is decided in consideration of the accuracy of the measurement whether or not the present position of the user is within an allowable range with a corresponding spot as the center. If it is within the allowable range, the game program advances to step S17. In step S17, points set at the corresponding spot are added. If it is not within the allowable range, in step S18 a target moving process is executed. In step S19 a penalty addition process is executed, and the game program advances to step S17.

Figure 5:
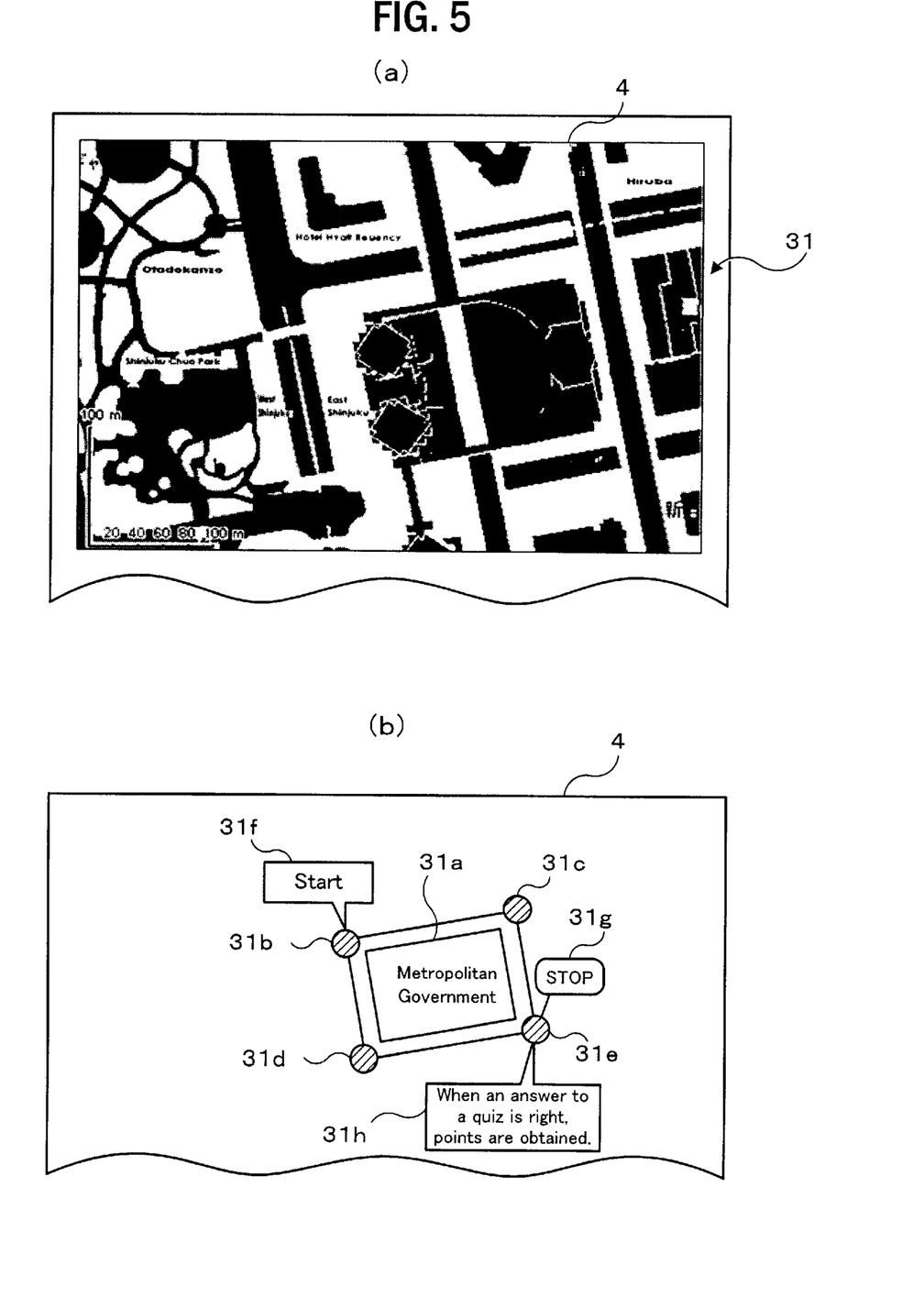
FIGS. 5A and 5B are diagrams showing how a position occupying game is executed on the liquid crystal display of the navigation apparatus of the preferred embodiment.

Next, in step S20, a moving-means selection process (walking, a car, a train, etc.) specified by the user is performed. In step S21, a map on a suitable scale is selected according to the moving means specified by the user. In step S22, a spot-points overlapping avoidance process is performed. Thereafter, the process of displaying a game screen such as that shown in FIG. 5 is repeatedly executed on the liquid crystal display 4.

Thus, in the game program shown, the present position of the user is first specified based on the positional information obtained by the position measuring section 10. Then, it is decided whether or not the user has arrived at preset spots. According to the arrival, a game-points process is performed. The points made by the user are displayed on the liquid crystal display 4. The user can predict a distance or direction to a destination, while making reference to the displayed map. The user can also move quickly toward the destination. In this manner, the user can enjoy a game like a position occupying game. Therefore, the navigation apparatus 1 in the preferred embodiment is capable of enhancing its utilization value, because it has the game function as well as the navigation function.

Note that the present invention is not limited to the aforementioned position occupying game. The present invention is applicable to any game, as long as it utilizes the positional information obtained by the position measuring section 10. For instance, it may be the following game.

Figure 7:
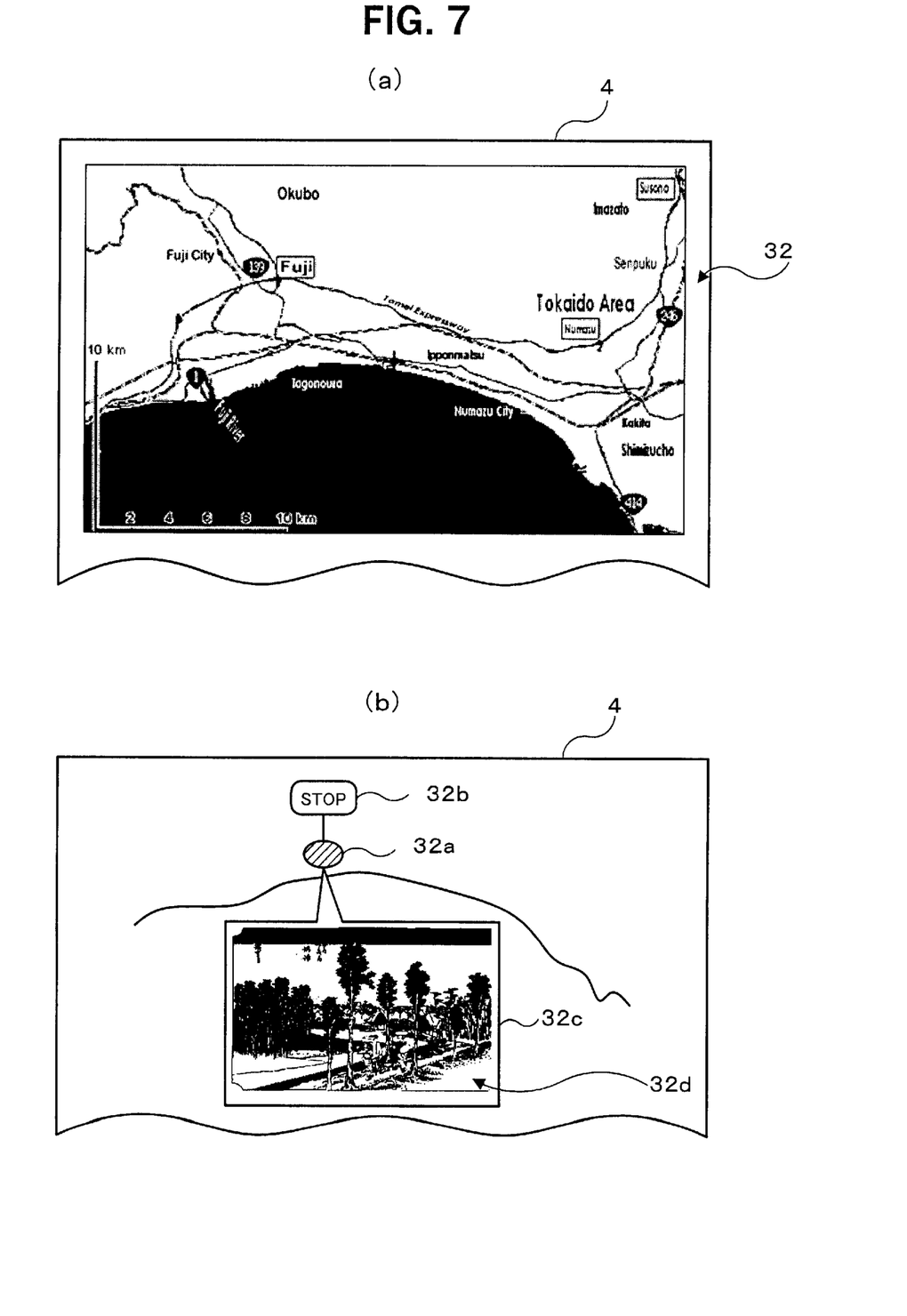
FIGS. 7A and 7B are diagrams showing how a game is executed by the navigation apparatus of the preferred embodiment.
Figure 8:
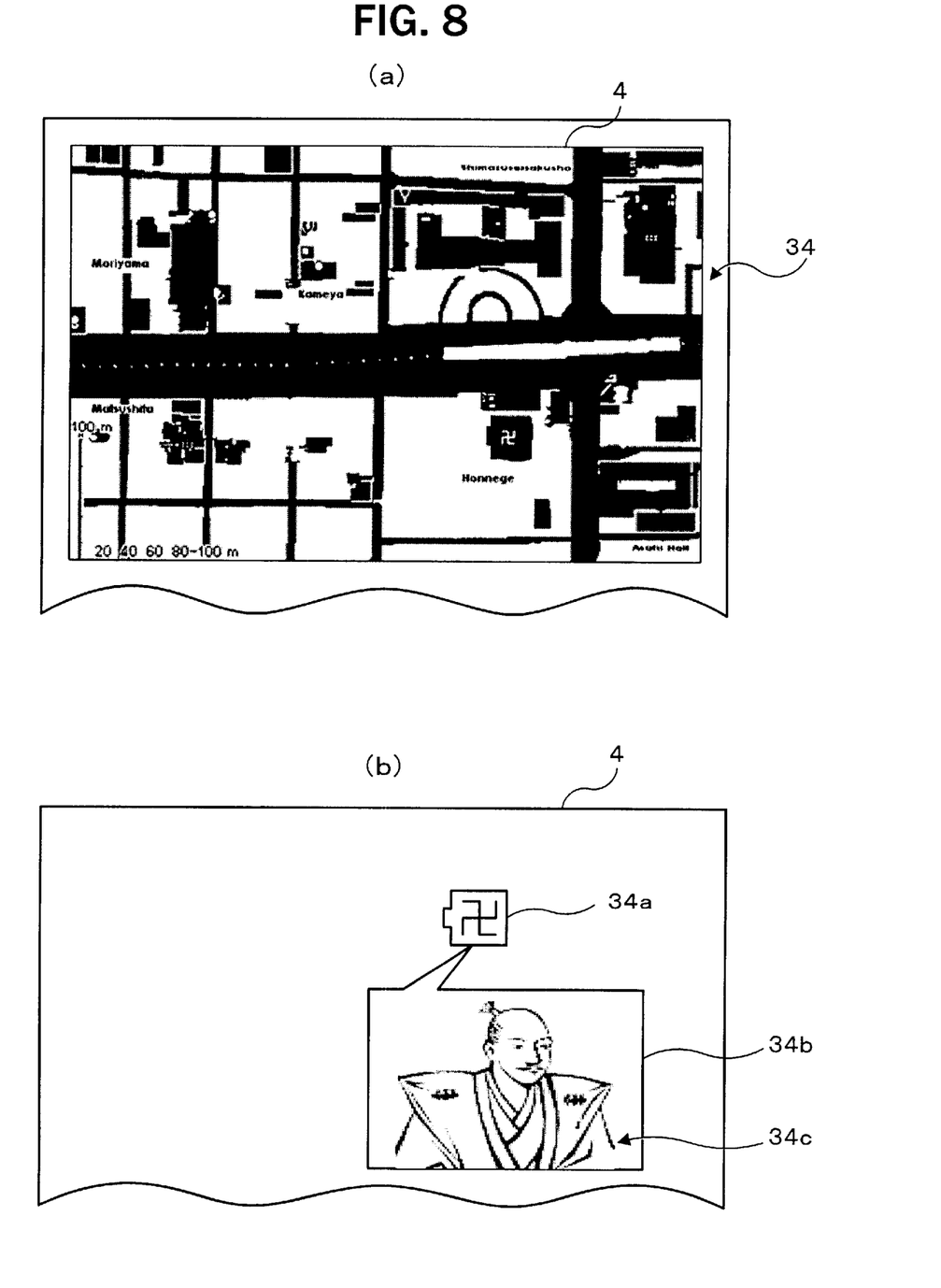
FIG. 8 is a diagram showing how a game is executed by the navigation apparatus of the preferred embodiment.

In the case where the aforementioned spots are places rich in historical associations, tourist resorts, noted natural features on the earth, etc., the description information is displayed on the liquid crystal display 4. An example is shown in FIGS. 7A and 7B. In this example, there is shown a map 32 of the Numazu Tokaido area and vicinity. If the user arrives at a preset spot 32*a,* a display frame 32*c* of description information 32*d* related to the spot 32*a* is displayed along with a stop mark 32*b.* The description information 32*d* in this example represents an ukiyoe (picture of everyday life in old Japan) from Numazu. Therefore, the user is able to think about a journey to the old Tokaido area. This can enhance utilization value as guidance rather than as a game. Note that when importance is attached to the game function, the description information 32 may be displayed in the form of a quiz. Particularly, in tourist resorts, the history, manners, and customs of each place can be learned in the form of a quiz. For example, as shown in FIG. 8, when the user goes to Kyoto to see the Temple of the Horyu, a map 34 of the Temple of the Horyu and neighborhood is displayed on the crystal liquid display 4. If the user reaches the Temple of the Horyu, an information 34*a* on "Nobunaga Oda" maybe displayed as a historical person on a display frame 34*b* of information associated with a target object (the Temple of the Horyu in this example).

Figure 9:
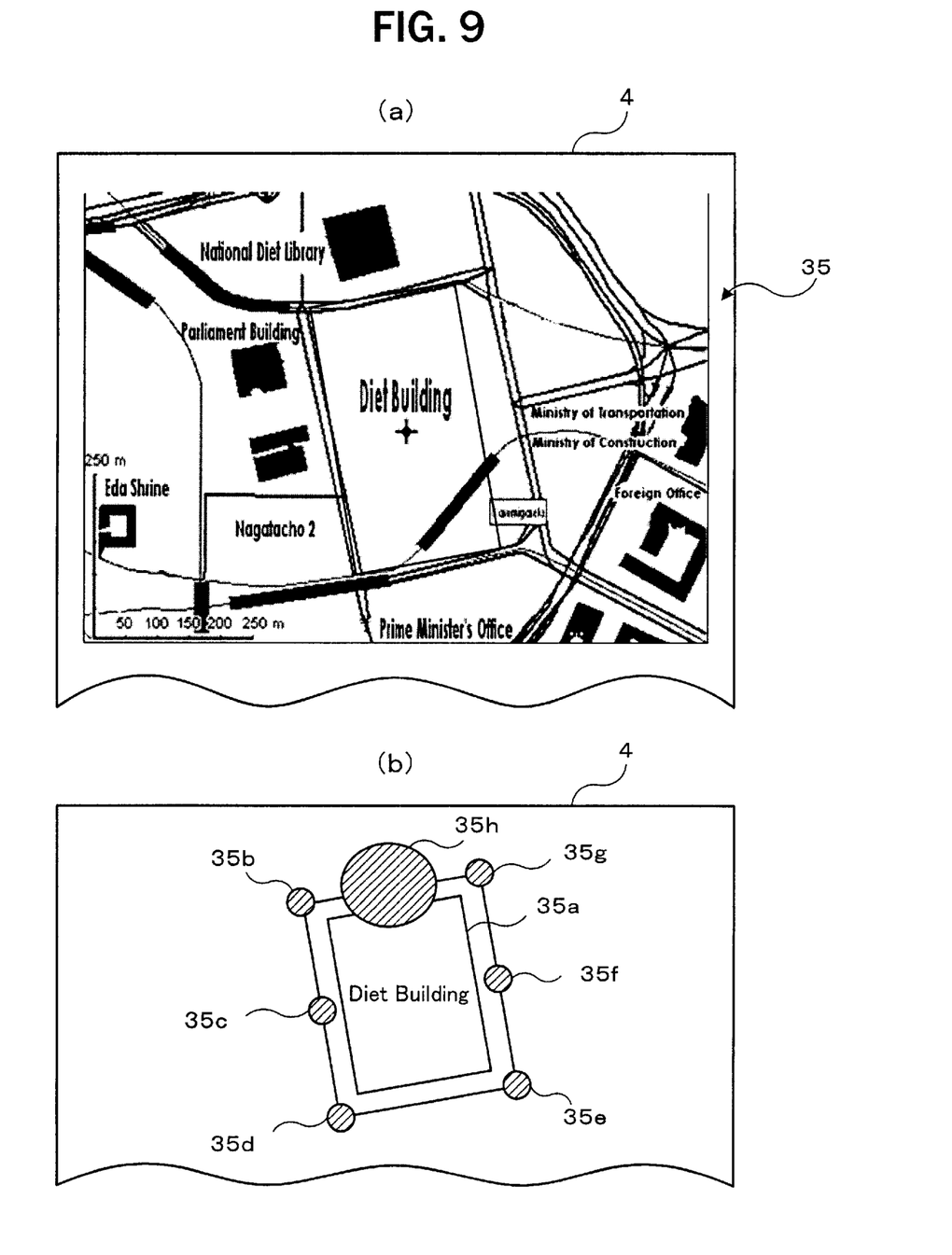
FIG. 9 is a diagram showing how a game is executed by the navigation apparatus of the preferred embodiment.

Note that there are cases where the user is forbidden to enter a target object. For instance, as shown in FIG. 9, when the Diet Building in a map 35 is a target object, it is necessary to obtain permission to approach or enter the building. In such a place, arbitrary spots 35*b* to 35*h* on roads around the target object 35*c* can be provided within an area where points are obtained. Alternatively, the present position of the user may be virtually moved to the target object with a cursor. However, in the case of virtual movement, it is necessary to set an upper limit to the number of movements, or to make a penalty heavier as the number of movements is increased.

Figure 10:
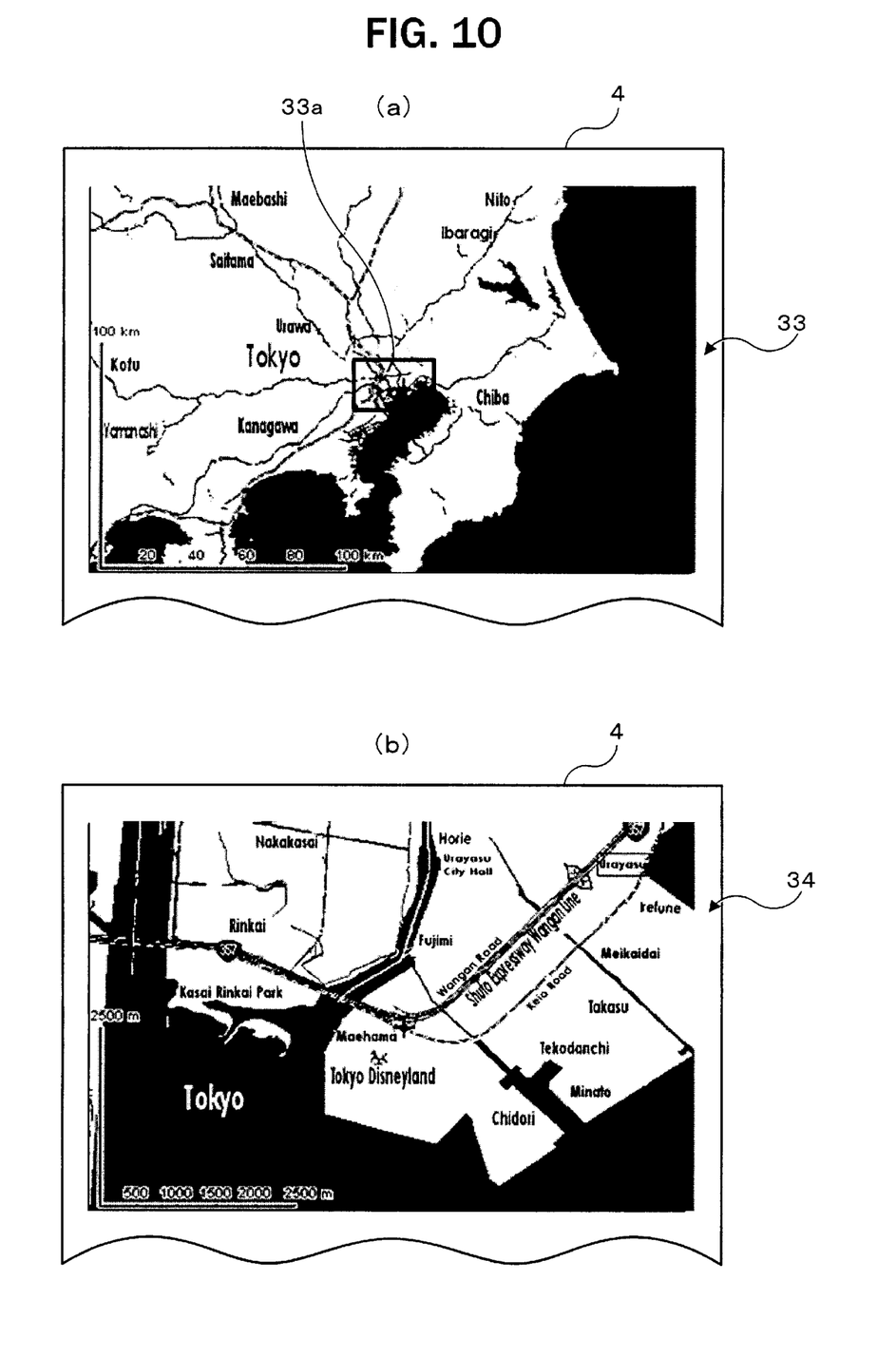
FIGS. 10A and 10B are diagrams showing the relationship between a wide area map and a detailed map.

In the foregoing description, it is as matter of course that when getting a general view, a wide area map is preferred and that when obtaining information on surroundings, a detailed map is preferred. For example, as shown in FIG. 10, it is preferable that a wide area diagram 33 and a detailed diagram 34 be freely switched. It is also preferable that a detailed 20 diagram frame 33*a* be displayed on the wide area diagram 33. A map that is used may be a virtual map including virtual geographical features. For a map of a midtown area, for instance, it may be a virtual map showing the Edo period, a virtual map showing the primitive ages or a future world, or a virtual map showing a combination of them.

Furthermore, the form of a game can be modified in various ways. For example, a game may be performed in the form of conversion. When the navigation apparatus 1 has a communication function, information may be transmitted to another navigation apparatus. After collection of information, it can make a topic of conversation later. Necessary maps may previously be stored in the navigation apparatus 1. However, it is not realistic due to storage capacity, a necessary amount of map information may be obtained from a personal computer, or may be downloaded through an Internet. Also, downloading terminals for map information may be installed in tourist resorts.

While the present invention has been described with reference to the preferred embodiment thereof, the invention is not to be limited to the details given herein, but may be modified within the scope of the invention hereinafter claimed.

What is claimed is:

1. A navigation apparatus comprising:

position acquisition means for acquiring positional information on a self-position;

map hold means for holding a map;

first display control means for reading out said map containing said self-position from said map hold means and then causing display means to display said map containing said self-position;

second display control means for setting a target spot at an arbitrary natural feature on the earth or arbitrary position within said map displayed on said display means and then causing said display means to display said target object;

event generation means for generating a predetermined game event when said self position arrives at said target spot, or is within a predetermined allowable range, or moves around a predetermined range; and game process means for performing a game process in response to said generated game event.

2. The navigation apparatus as set forth in claim 1, wherein said position acquisition means acquires said positional information by utilizing a global positioning system.

3. The navigation apparatus as set forth in claim 1, wherein said game process means sets a quiz in response to said generated game event, and performs a game-points process, based on an answer to said quiz.

4. The navigation apparatus as set forth in claim 2, wherein said game process means sets a quiz in response to said generated game event, and performs a game-points process, based on an answer to said quiz.

5. The navigation apparatus as set forth in claim 3, wherein said quiz has contents related to said target spot.

6. The navigation apparatus as set forth in claim 1, wherein said map hold means holds a virtual map including virtual geographical features and natural features on the earth.

* * * * *